US011874297B2

(12) United States Patent
Trapp et al.

(10) Patent No.: US 11,874,297 B2
(45) Date of Patent: Jan. 16, 2024

(54) HIGH-RESOLUTION PWM WHEEL SPEED SENSOR PROTOCOL

(71) Applicant: Continental Automotive Technologies GmbH, Hannover (DE)

(72) Inventors: René Trapp, Föckelberg (DE); Mario Trott, Münster (DE); Tillmann Krauss, Frankfurt (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/759,692

(22) PCT Filed: Jan. 28, 2021

(86) PCT No.: PCT/DE2021/200007
§ 371 (c)(1),
(2) Date: Jul. 28, 2022

(87) PCT Pub. No.: WO2021/151439
PCT Pub. Date: Aug. 5, 2021

(65) Prior Publication Data
US 2023/0072836 A1  Mar. 9, 2023

(30) Foreign Application Priority Data
Jan. 29, 2020 (DE) .................... 10 2020 201 080.3

(51) Int. Cl.
*G01P 3/481* (2006.01)
(52) U.S. Cl.
CPC .................................. *G01P 3/481* (2013.01)
(58) Field of Classification Search
CPC ................................. G01P 3/481; G01P 3/489
See application file for complete search history.

(56) References Cited

U.S. PATENT DOCUMENTS 6,653,968 B1  11/2003  Schneider
2003/0141862 A1  7/2003  Vig et al.
(Continued)

FOREIGN PATENT DOCUMENTS

DE  102014100994 A1  7/2014
DE  102018222791 A1  6/2019
(Continued)

OTHER PUBLICATIONS

German Search Report dated Oct. 29, 2021, for the counterpart German Patent Application No. 10 2021 200 792.9.
(Continued)

*Primary Examiner* — Jermele M Hollington
*Assistant Examiner* — Zannatul Ferdous (57) ABSTRACT

A sensor for detecting relative movements between an encoder, having a substantially periodic scale and/or pattern, and at least one sensor element, wherein the sensor comprises at least one sensor element and a signal processing device, the signal processing device being designed to take the sensor element output signal of the sensor element as a basis for providing a movement signal, wherein the signal processing device is designed such that it has two or more switching thresholds for the at least one sensor element output signal, movement information that is taken into consideration for generating the movement signal being generated substantially whenever a switching threshold is exceeded and/or is fallen short of by the sensor element output signal, wherein the signal processing device is designed such that the appearance of movement information results in a particular movement impulse of defined duration being generated in the movement signal, wherein the signal processing device is designed to substantially rate and/or compute a relative velocity between the encoder and the sensor element by itself and the defined duration of the
(Continued)

| Parameter | Min / us | Nom / us | Max / us | Gap / us | | typ. fmax [Hz] | typ. Vmax [km/h] |
|---|---|---|---|---|---|---|---|
| Warnpuls | 40,5 | 45,0 | 49,5 | 31,5 | – | 10582,0 | 755,86 |
| DR-L Puls | 81,0 | 90,0 | 99,0 | 22,5 | | 6944,4 | 496,03 |
| HR-L | 121,5 | 135,0 | 148,5 | 13,5 | | 5168,0 | 369,14 |
| DR-R Puls | 162,0 | 180,0 | 198,0 | 4,5 | | 4115,2 | 293,94 |
| HR-R | 202,5 | 225,0 | 247,5 | | | 3418,8 | 244,20 |
| DR-L & EL Puls | 324,0 | 360,0 | 396,0 | 76,5 | 252,0 | 2267,6 | 161,97 |
| DR-R & EL Puls | 648,0 | 720,0 | 792,0 | 504,0 | | 1194,7 | 85,34 |
| Stillstand | 1296,0 | 1440,0 | 1584,0 | – | | – | – | movement impulse is dependent on the circumstance of at least one first limit velocity for the relative velocity between the encoder and the sensor element being exceeded and/or being fallen short of. It is therefore possible for the signal processing device to identify for example whether the sensor is currently operating in a high-resolution mode. The pulse length may additionally also vary on the basis of further status information such as direction of rotation or gap size.

7 Claims, 5 Drawing Sheets (56) References Cited

U.S. PATENT DOCUMENTS

| | | | | |
|---|---|---|---|---|
| 2004/0189282 | A1* | 9/2004 | Schmid | G01P 13/04 |
| | | | | 324/207.2 |
| 2005/0253054 | A1* | 11/2005 | Guarino | G01D 5/24476 |
| | | | | 341/13 |
| 2012/0116664 | A1 | 5/2012 | Shibata | |
| 2014/0210641 | A1 | 7/2014 | Hammerschmidt | |
| 2017/0144672 | A1 | 5/2017 | Endres | |
| 2017/0160303 | A1 | 6/2017 | Jockel et al. | |
| 2018/0210004 | A1* | 7/2018 | Tepass | G01P 3/489 |
| 2019/0120914 | A1 | 4/2019 | Hammerschmidt et al. | |
| 2020/0088550 | A1* | 3/2020 | Lorber | G01R 33/0029 |

FOREIGN PATENT DOCUMENTS

| | | |
|---|---|---|
| DE | 102018215938 A1 | 3/2020 |
| EP | 1074843 A1 | 2/2001 |
| EP | 3748403 A1 | 12/2020 |
| WO | 2016023769 A2 | 2/2016 |
| WO | 2017089561 A1 | 6/2017 |

OTHER PUBLICATIONS

The International Search Report and the Written Opinion of the International Searching Authority dated Apr. 19, 2021, for the counterpart PCT Application No. PCT/DE2021/200007.

* cited by examiner

| Parameter | Min / us | Nom / us | Max / us | Gap / us | | typ. fmax [Hz] | typ. Vmax [km/h] |
|---|---|---|---|---|---|---|---|
| Warnpuls | 40,5 | 45,0 | 49,5 | – | | 10582,0 | 755,86 |
| DR-L Puls | 81,0 | 90,0 | 99,0 | 31,5 | 22,5 | 6944,4 | 496,03 |
| HR-L | 121,5 | 135,0 | 148,5 | | | 5168,0 | 369,14 |
| DR-R Puls | 162,0 | 180,0 | 198,0 | 13,5 | 4,5 | 4115,2 | 293,94 |
| HR-R | 202,5 | 225,0 | 247,5 | | | 3418,8 | 244,20 |
| DR-L & EL Puls | 324,0 | 360,0 | 396,0 | 76,5 | 252,0 | 2267,6 | 161,97 |
| DR-R & EL Puls | 648,0 | 720,0 | 792,0 | 504,0 | | 1194,7 | 85,34 |
| Stillstand | 1296,0 | 1440,0 | 1584,0 | | – | – | – |

| Parameter | Min / us | Nom / us | Max / us | Gap / us | | typ. fmax [Hz] | typ. Vmax [km/h] |
|---|---|---|---|---|---|---|---|
| Warnpuls | 39,2 | 45,0 | 50,9 | 27,5 | – | | |
| DR-L Puls | 78,3 | 90,0 | 101,7 | | 54,9 | 10433,0 | 745,21 |
| DR-R Puls | 156,6 | 180,0 | 203,4 | 31,5 | | 6816,6 | 486,90 |
| HR-L | 234,9 | 270,0 | 305,1 | | 8,1 | 4025,8 | 287,55 |
| HR-R | 313,2 | 360,0 | 406,8 | 63,0 | | 2856,3 | 204,02 |
| DR-L & EL Puls | 469,8 | 540,0 | 610,2 | | 16,2 | 2213,4 | 158,10 |
| DR-R & EL Puls | 626,4 | 720,0 | 813,6 | 439,2 | | 1526,3 | 109,02 |
| Stillstand | 1252,8 | 1440,0 | 1627,2 | – | | 1164,7 | 83,19 |
| | | | | | | – | – |

Fig. 7 ly when any movement information is generated, the signal processing device rates and/or computes the relative velocity between the encoder and the sensor element, as a velocity, by itself on the basis of the appearance of this last movement information over time and of one or more pieces of movement information that have appeared previously, in particular in a manner filtered in a defined way.

HIGH-RESOLUTION PWM WHEEL SPEED SENSOR PROTOCOL

CROSS-REFERENCE TO RELATED APPLICATIONS

The present application is a National Stage Application under 35 U.S.C. § 371 of International Patent Application No. PCT/DE2021/200007 filed on Jan. 28, 2021, and claims priority from German Patent Application No. 10 2020 201 080.3 filed on Jan. 29, 2020, in the German Patent and Trade Mark Office, the disclosures of which are herein incorporated by reference in their entireties.

BACKGROUND

Embodiments of the present application relate to a sensor, such as a high-resolution pulse width modulation (PWM) wheel speed sensor and protocol thereof.

SUMMARY

Embodiments of the present application relate to a sensor is able to detect relatively precise relative movements between an encoder and a sensor element, in particular with a relatively high resolution, and/or that is relatively inexpensive and/or the output signal from which can easily be used for a velocity measurement in different velocity ranges and/or that is relatively reliable, or robust.

According to an aspect of an embodiment, there is provided a sensor, the sensor being designed to detect relative movements between an encoder, having a substantially periodic scale and/or pattern, and at least one sensor element, wherein the sensor comprises at least one sensor element and a signal processing device, the signal processing device being designed to take the sensor element output signal of the sensor element as a basis for providing a movement signal, wherein the signal processing device is designed such that it has two or more switching thresholds for the at least one sensor element output signal, movement information that is taken into consideration for generating the movement signal being generated substantially whenever a switching threshold is exceeded and/or is fallen short of by the sensor element output signal, wherein the signal processing device is designed such that the appearance of movement information results in a particular movement impulse of defined duration being generated in the movement signal, wherein the signal processing device is designed to substantially rate and/or compute a relative velocity between the encoder and the sensor element by itself and the defined duration of the movement information and/or of the movement impulse is dependent on the circumstance of at least one first limit velocity for the relative velocity between the encoder and the sensor element being exceeded and/or being fallen short of.

The sensor is preferably designed to detect the angle of rotation, or the distance, or angle, or range, of a relative movement between the encoder and the sensor element. The sensor is preferably in the form of a velocity sensor and/or rotational speed sensor and/or angular velocity sensor, in particular in the form of a crankshaft speed sensor or wheel speed sensor or transmission speed sensor or turbocharger speed sensor.

The velocity of the last movement information or the reference to this velocity preferably means that, substantially when any movement information is generated, the signal processing device rates and/or computes the relative velocity between the encoder and the sensor element, as a velocity, by itself on the basis of the appearance of this last movement information over time and of one or more pieces of movement information that have appeared previously, in particular in a manner filtered in a defined way.

The relative velocity between the encoder and the sensor element is alternatively preferably understood to mean a relative movement, or a relative change of rotation angle, or a relative change of range, between the encoder and the sensor element.

The duration of the movement impulse is preferably understood to mean the length of this impulse.

A movement impulse is preferably substantially understood to mean an electrical square-wave signal, in particular having two signal levels.

The second limit velocity is expediently higher than the first limit velocity.

It is preferred for the signal processing device to have three or more switching thresholds, in particular 2N+1 switching thresholds, where N is a natural number, in particular N=1 is selected, for the at least one sensor element output signal, one of these switching thresholds being designed as a mean value switching threshold, which means that its threshold value substantially corresponds to the mean value of the sensor element output signal.

It is preferred for the at least one sensor element to include a bridge circuit having at least two half-bridges or for the sensor to comprise at least two sensor elements, the at least two half-bridges or the at least two sensor elements each providing a sensor element output signal that is supplied to the signal processing device, and the signal processing device being designed such that particular movement information that is taken into consideration for generating the movement signal is generated when a respective switching threshold is exceeded and is fallen short of by the respective sensor element output signal of one of the half-bridges or of one of the two sensor elements. The signal processing device expediently includes at least two signal paths for this purpose.

The at least two half-bridges or the at least two sensor elements are in particular arranged in the sensor such that they detect or are able to detect the periodic scale and/or the pattern of the encoder with a phase offset of substantially 90°. In the case of three half-bridges or three sensor elements, the periodic scale and/or the pattern of the encoder is detected with a phase offset of substantially 60° or 120°. The sensor elements, or half-bridges, are particularly preferably designed and/or arranged in the sensor, in this case quite particularly preferably arranged and oriented relative to the encoder within the sensor arrangement, such that the sensor element output signals of the at least two sensor elements, or half-bridges, substantially have a sinusoidal or cosine-shaped time characteristic with a phase offset of substantially 90° with respect to one another.

The at least one sensor element is preferably in the form of a magnetic field sensor element, in particular in the form of an AMR sensor element, that is to say in the form of an anisotropic magnetoresistive, or Hall or GMR, sensor element, that is to say in the form of a giant magnetoresistive sensor element, or a sensor element based on the giant magnetoresistance principle, or TMR sensor element, that is to say in the form of a tunnel magnetoresistive sensor element.

The signal processing device is preferably designed such that every switching threshold includes a hysteresis.

A signal processing device is preferably understood to mean a signal processing circuit and/or a user programmable circuit.

The signal processing device preferably includes a microcontroller, or an electronic circuit having defined, or stipulated, logic, or firmly programmed flow control and/or signal processing processes, that performs at least some or all calculations and/or signal generation operations and/or adaptations of the threshold values of the switching thresholds and is of appropriate design.

The signal processing device preferably comprises a clock generator unit, which is in particular in the form of an oscillator and particular preferably comprises at least one transistor and at least one capacitance element. The clock generator unit expediently includes no crystal oscillator and no ceramic resonator.

The signal processing device expediently includes multiple storage elements, or at least one memory for storing data, or values, or in particular for storing defined durations of the movement impulses, or for storing the switching thresholds and/or reference velocities.

It is preferred for the velocity signal, or movement signal, or angle/rotation angle signal, as the output signal of the sensor, to at least be dependent on the relative velocity between the encoder and the sensor element, at least in respect of the appearance of the movement impulses in this velocity signal, and to be provided by the sensor at the output, in particular on a two-wire interface.

A signal processing device is preferably understood to mean a signal processing circuit.

The term sensor element output signal is expediently understood to mean the output signal of the at least one, or of a, sensor element.

It is preferred for the signal processing device and the at least one sensor element to be integrated on a chip, or ASIC.

The sensor expediently comprises a plastic housing, and two connections as an interface for connection to an electronic control unit of a motor vehicle control, or automatic control, system. The sensor is in particular in the form of an active sensor and is supplied with electric power via this interface.

It is preferred for a particular movement impulse of defined duration to be generated in the movement signal on the basis of the appearance of movement information, the duration of the movement impulse encoding, in particular uniquely, at least one of the following pieces of information:
forward or backward direction of the relative movement between the encoder and the sensor element and/or the presence of an error and/or the circumstance of at least one first limit velocity being exceeded and/or being fallen short of.

It is expedient for the signal processing device to be designed to rate and/or compute the circumstance of at least a first and a second limit velocity being exceeded and/or being fallen short of.

The signal processing device is preferably designed such that the circumstance of the first limit velocity of the last movement information being fallen short of and/or not being exceeded results in it generating the next movement information in a high-resolution mode of the sensor if two or more switching thresholds for the at least one sensor element output signal are exceeded and/or are fallen short of, wherein the signal processing device is designed such that the circumstance of the first limit velocity of the last movement information being exceeded and/or not being fallen short of, and in particular the circumstance of the second limit velocity of the last movement information being fallen short of and/or not being exceeded, results in it generating the next movement information in a low-resolution mode of the sensor if two or more switching thresholds for the at least one sensor element output signal are exceeded or are fallen short of or if fewer switching thresholds are exceeded and/or are fallen short of than when the first limit velocity of the last movement information is fallen short of and/or is not exceeded.

It is preferred for the signal processing device to be designed such that the appearance of movement information results in it generating the respective movement impulse such that one or more of the following pieces of information are coded, in particular uniquely, in its duration:
forward or backward direction of the relative movement between the encoder and the sensor element and/or
the presence of an error and/or
whether the sensor is currently in the high-resolution mode or in the low-resolution mode or if the second limit velocity is exceeded or is not fallen short of.
It is preferred for the signal processing device to be designed such that for all combinations of the information pairs
forward or backward direction of the relative movement between the encoder and the sensor element and/or
the presence or absence of an error and/or
whether the sensor is currently in the high-resolution mode or in the low-resolution mode
it is configured to generate a movement impulse having a unique defined duration, for encoding the current information of the respective information pairs, and in particular having a further unique defined duration for encoding the circumstance of the second limit velocity being exceeded or not being fallen short of and/or in particular having a further unique defined duration for encoding an undetected relative movement between the encoder and the sensor element, which is generated after a defined time to identify a halt.

It is preferred for the signal processing device to be designed such that the circumstance of any switching threshold for the at least one sensor element output signal being exceeded and/or being fallen short of is provided with a hysteresis and/or that the assessing, or computing, of the relative velocity between the encoder and the sensor element in respect of the first and/or second limit velocity is provided with a hysteresis. In particular, the hysteresis is achieved by forming two particular hysteresis thresholds per switching threshold.

It is preferred for the sensor to be in the form of a velocity sensor, in particular in the form of a wheel speed sensor.

An error is preferably understood to mean an internal sensor error or an unacceptable, or excessively large, gap between the sensor element and the encoder that is produced by way of a field strength measurement, or relative field strength measurement, by means of the sensor element. In particular, the field strength measurement, or relative field strength measurement, is understood to mean that a minimum value and a maximum value of the detected field strength is evaluated.

DETAILED DESCRIPTION

FIGS. 1 to 6 are used below to schematically demonstrate, by way of illustration, the encoding of the different information by way of the unique, defined duration of the movement impulses, the sensor being in the form of a wheel speed sensor in a motor vehicle.

Figure 1:
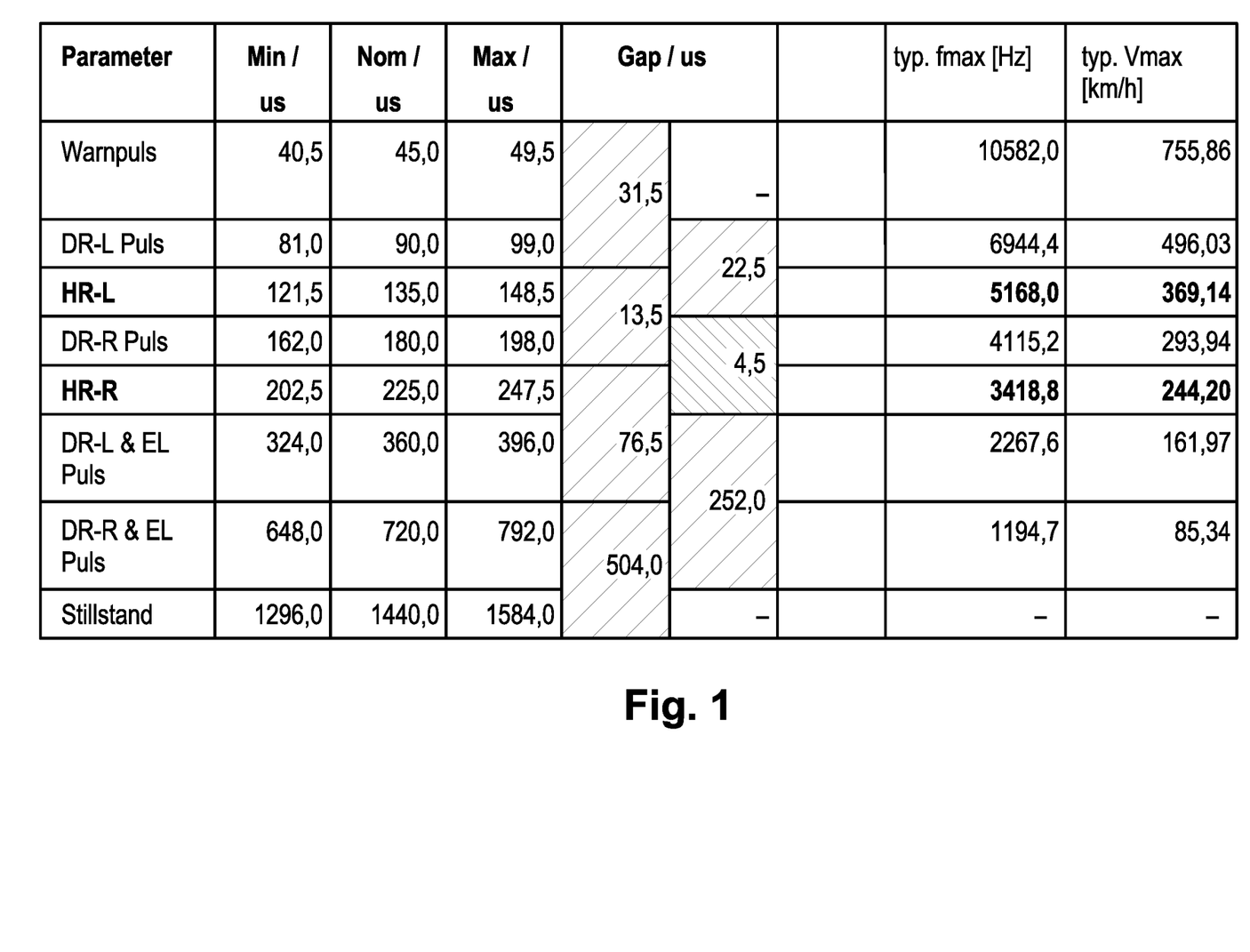
FIG. 1, FIG. 2, and FIG. 3 illustrate a tolerance, or variance, in the durations of the movement impulses, according to an embodiment.
Figure 2:
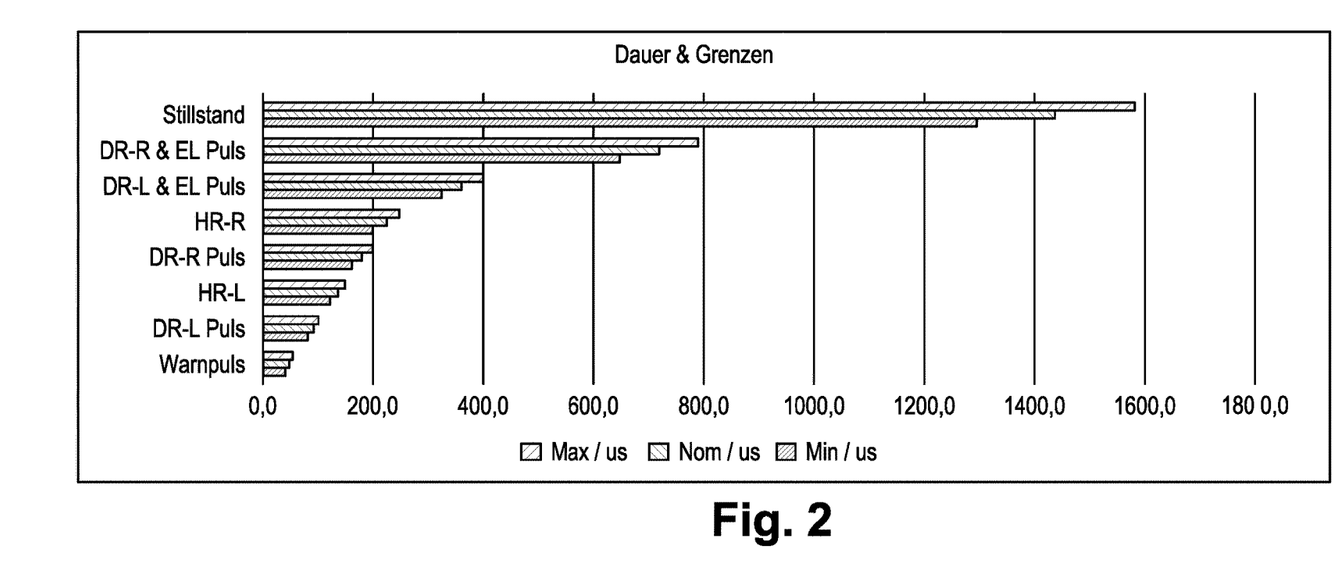
Figure 3:
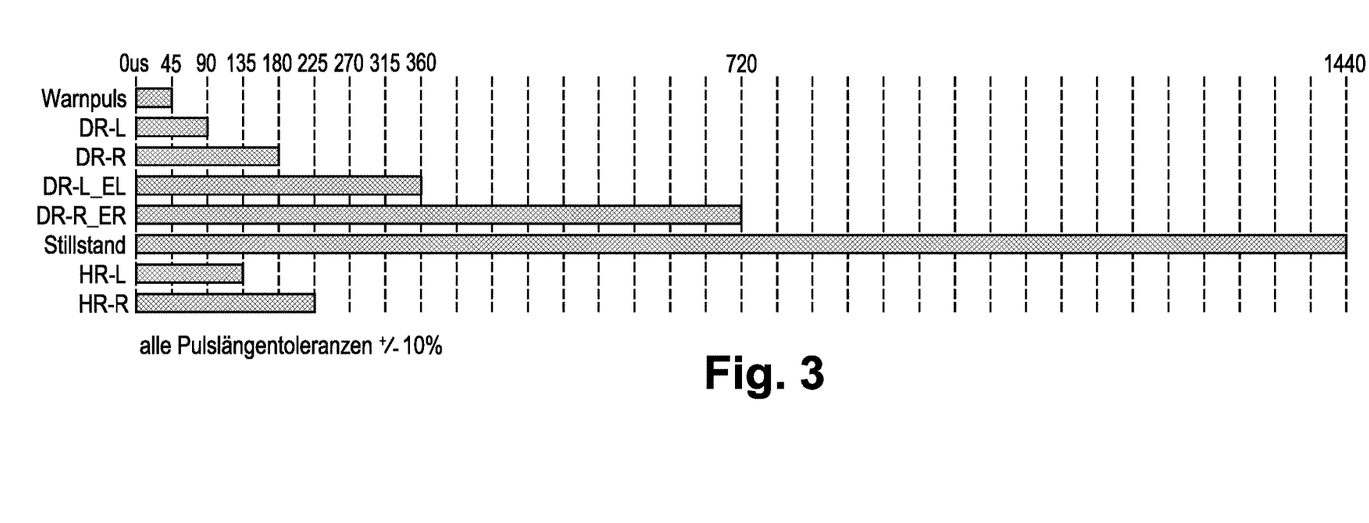

FIGS. 1, 2, and 3 show a first exemplary embodiment with a tolerance, or variance, in the durations of the movement impulses of 10%. FIG. 1 shows a table of the defined durations, with possible minimum Min, maximum Max and nominal Nom durations in μs, of the movement impulses and also the associated maximum frequencies fmax of the movement impulses and the possible maximum velocity of an applicable vehicle Vmax in km/h.

The movement impulses in the high-resolution mode are denoted by HR for high resolution, and the movement impulses in/for the low-resolution mode are denoted by DR.

For a high vehicle velocity up to Vmax, that is to say a velocity above the second limit velocity, the information is coded in the DR movement impulses, and for vehicle velocities below the second limit velocity the information is coded in the HR movement impulses. The direction of movement to the right is labelled –R each time and the direction of movement to the left is labelled –L each time. Coded gap information indicating that the gap between the sensor and the encoder is excessively large is labelled EL.

In addition, the movement impulse that encodes the halt, Standstill, has the longest duration and the movement impulse that encodes error information, Warning Pulse, has the shortest duration. The Gap columns describe the differences in the durations in μs for the movement impulses whose durations are adjacent.

These durations of the movement impulses are then shown for the different coded information on the basis of the graphical representations in FIGS. 2 and 3.

In this case, the smallest tolerance margin is formed by the distance between the standard-resolution pulse (DR-R) and high-resolution pulses (HR-R) at 4.5 μs.

Figure 4:
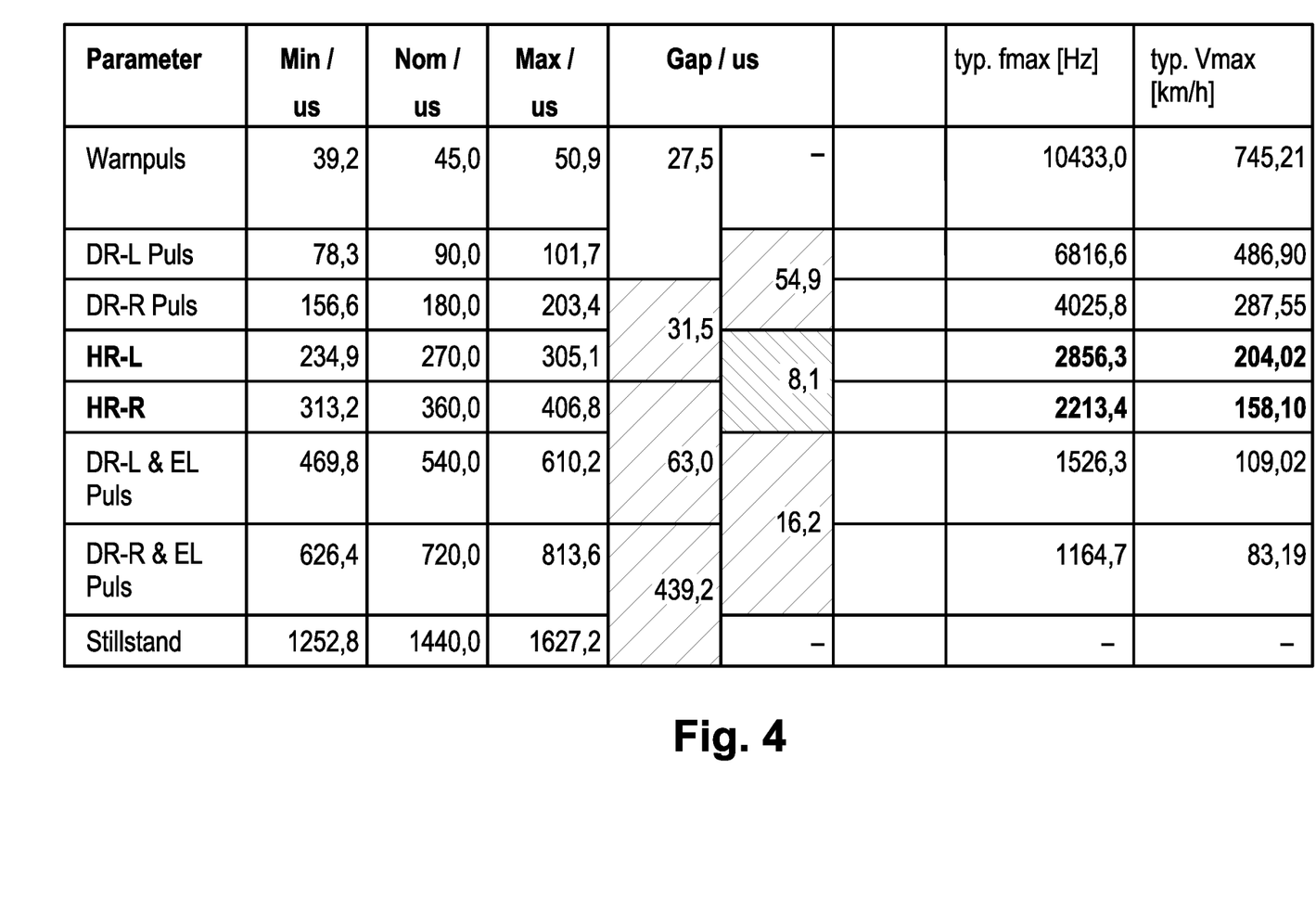
FIG. 4, FIG. 5, and FIG. 6 illustrate a tolerance, or variance, in the durations of the movement impulses, according to an embodiment.
Figure 5:
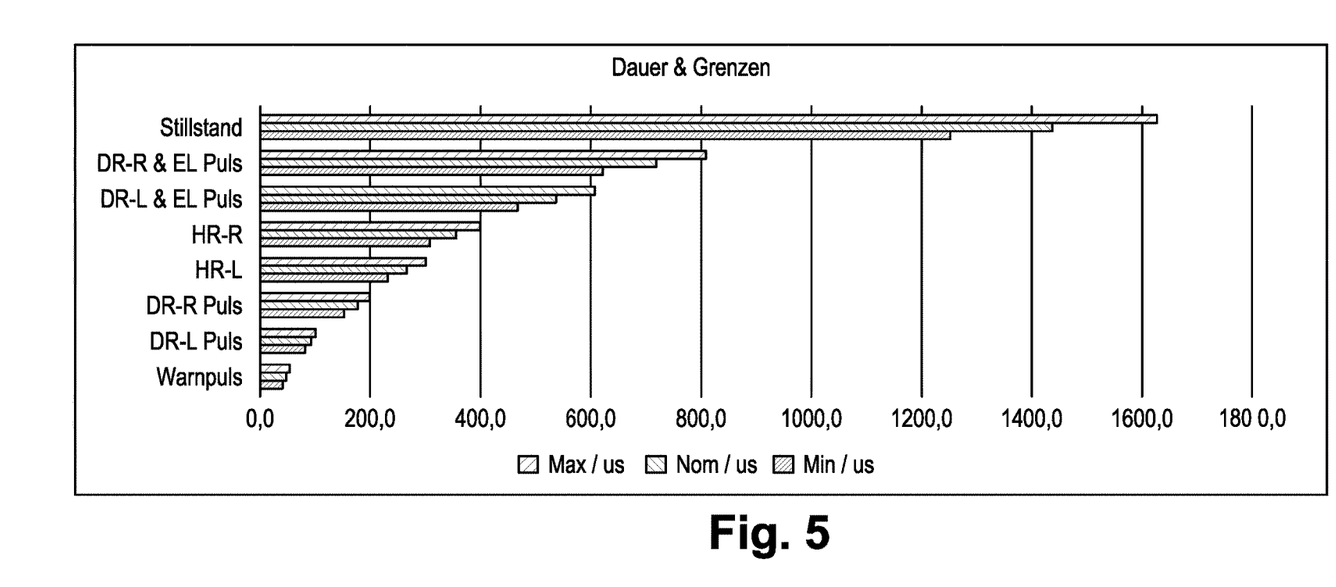
Figure 6:
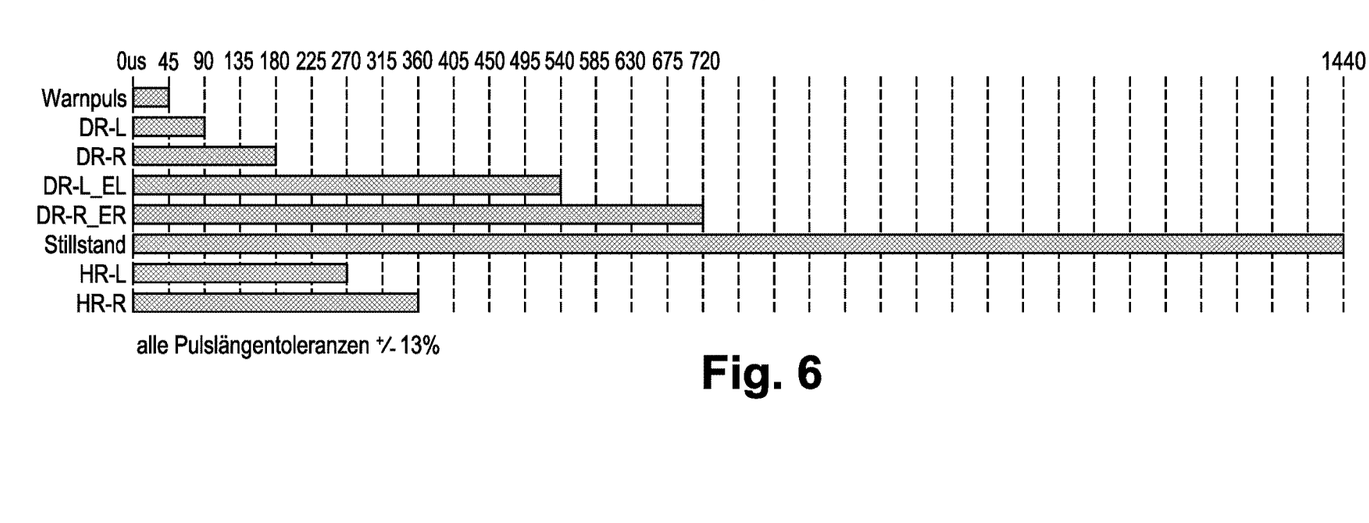

FIGS. 4, 5, and 6 show a second exemplary embodiment with a tolerance, or variance, in the durations of the movement impulses of 13%. This tolerance increases the robustness of the sensor and may reduce expenditure for sensor manufacture and for sensor design.

FIG. 4 shows a table of the defined durations, with possible minimum Min, maximum Max and nominal Nom durations in μs, of the movement impulses and also the associated maximum frequencies fmax of the movement impulses and the possible maximum velocity of an applicable vehicle Vmax in km/h.

The movement impulses in the high-resolution mode are denoted by HR for high resolution, and the movement impulses in/for the low-resolution mode are denoted by DR.

For a high vehicle velocity up to Vmax, that is to say a velocity above the second limit velocity, the information is coded in the DR movement impulses, and for vehicle velocities below the second limit velocity the information is coded in the HR movement impulses. The direction of movement to the right is labelled –R each time and the direction of movement to the left is labelled –L each time. Coded gap information indicating that the gap between the sensor and the encoder is excessively large is labelled EL.

In addition, the movement impulse that encodes the halt, Standstill, has the longest duration and the movement impulse that encodes error information, Warning Pulse, has the shortest duration. The Gap columns describe the differences in the durations in μs for the movement impulses whose durations are adjacent.

These durations of the movement impulses are then shown for the different coded information on the basis of the graphical representations in FIGS. 5 and 6.

In this case, the smallest tolerance margin is formed by the distance between the standard-resolution pulse (DR-R) and high-resolution pulses (HR-R) at 8.1 μs.

Figure 7:
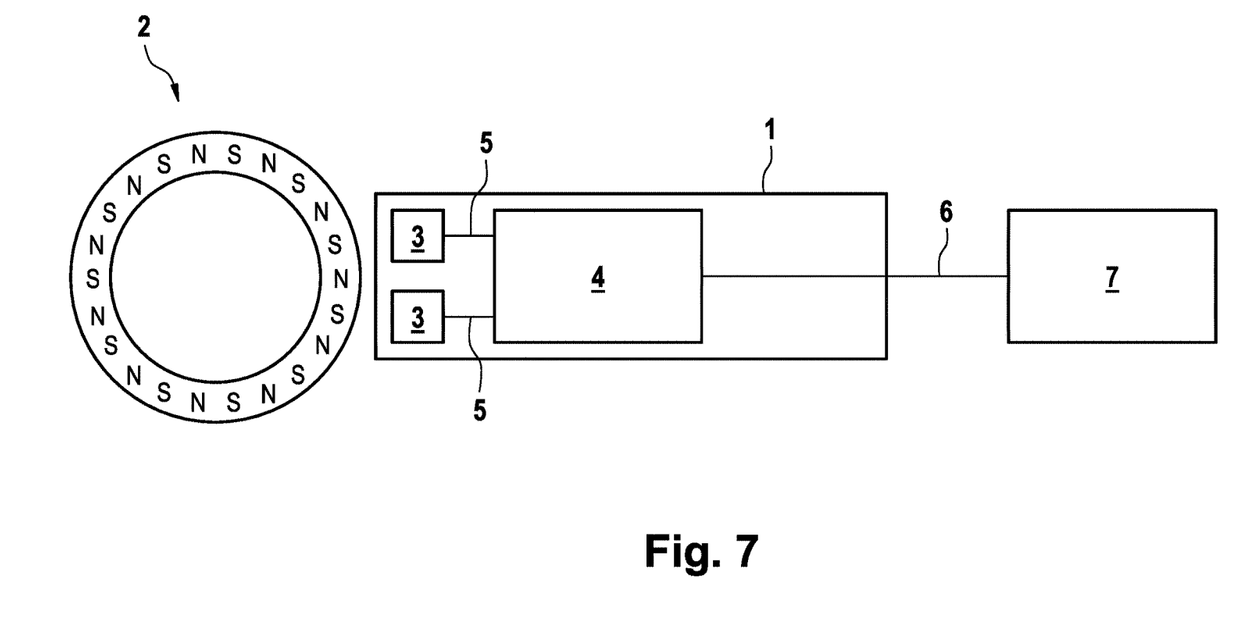
FIG. 7 illustrates a sensor arrangement, according to an embodiment.

FIG. 7 shows an illustration of a sensor arrangement, comprising the sensor 1, an alternately permanently magnetized encoder 2, the movements of which are detected by the sensor 1, and an electronic control unit 7 to which the sensor 1 is connected and that provides the output signal from the sensor 1.

The two sensor elements 3 of the sensor 1 detect the magnetic field of the encoder 2 and each provide a sensor element output signal 5 to the signal processing device 4.

The signal processing device 4 is designed to take the sensor element output signals 5 of the sensor elements 3 as a basis for providing a movement signal 6 to the electronic control unit 7 as the output signal of the sensor 1.

The signal processing device 4 is designed such that it has two or more switching thresholds for the at least one sensor element output signal, movement information that is taken into consideration for generating the movement signal 6 being generated substantially whenever a switching threshold is exceeded and/or is fallen short of by the sensor element output signal 5.

The signal processing device 4 is designed such that the appearance of movement information results in a particular movement impulse of defined duration being generated in the movement signal, wherein the signal processing device 4 is designed to substantially rate and/or compute a relative velocity between the encoder 1 and the sensor elements 3 by itself and the defined duration of the movement impulse is dependent on the circumstance of at least one first limit velocity for the relative velocity between the encoder 2 and the sensor elements 3 being exceeded and/or being fallen short of.

The invention claimed is:

1. A sensor for detecting relative movements between an encoder, having a periodic scale and/or pattern, and at least one sensor element, the sensor comprising:
   a sensor element configured to generate a sensor element output signal; and
   a signal processing device configured to output a movement signal based on the sensor element output signal,
   wherein the signal processing device is configured to output two or more switching thresholds based on the sensor element output signal,
   wherein the signal processing device is configured to compute a relative velocity between the encoder and the sensor element and a defined duration of a movement impulse of the movement signal is dependent on the relative velocity between the encoder and the sensor element being exceeded and/or being fallen short of,
   wherein the signal processing device is configured such that for all combinations of the information pairs forward or backward direction of the relative movement between the encoder and the sensor element, and/or the presence or absence of an error and/or, whether the sensor is currently in the high-resolution mode or in the low-resolution mode, the signal processing device is configured to generate a movement impulse having a unique defined duration, for encoding the current information of the respective information pairs, and having a further unique defined duration for encoding the circumstance of the second limit velocity being exceeded or not being fallen short of and/or in particular having a further unique defined duration for encoding an undetected relative movement between the encoder and the sensor element, which is generated after a defined time to identify a halt.

2. The sensor as claimed in claim 1, wherein the movement impulse of defined duration is generated in the movement signal on the basis of an appearance of movement information, the duration of the movement impulse encoding at least one of the following pieces of information:

forward or backward direction of the relative movement between the encoder and the sensor element and/or the presence of an error and/or the circumstance of at least one first limit velocity being exceeded and/or being fallen short of.

3. The sensor as claimed in claim 1, wherein the signal processing device is configured to rate and/or compute the circumstance of at least a first and a second limit velocity being exceeded.

4. The sensor as claimed in claim 3, wherein the signal processing device is configured such that the circumstance of the first limit velocity of the last movement information being exceeded results in generating the next movement information in a high-resolution mode of the sensor if two or more switching thresholds for the at least one sensor element output signal are exceeded, and wherein the signal processing device is configured such that the circumstance of the first limit velocity of the last movement information being exceeded and/or not being fallen short of, and in particular the circumstance of the second limit velocity of the last movement information being fallen short of and/or not being exceeded, results in generating the next movement information in a low-resolution mode of the sensor if two or more switching thresholds for the sensor element output signal are exceeded or are fallen short of or if fewer switching thresholds are exceeded and/or are fallen short of than when the first limit velocity of the last movement information is fallen short of and/or is not exceeded.

5. The sensor as claimed in claim 4, wherein the signal processing device is configured such that the appearance of movement information results in generating the respective movement impulse such that one or more of the following pieces of information are coded in its duration:

forward or backward direction of the relative movement between the encoder and the sensor element and/or, the presence of an error and/or, whether the sensor is currently in the high-resolution mode or in the low-resolution mode or if the second limit velocity is exceeded or is not fallen short of.

6. The sensor as claimed in claim 1, wherein the signal processing device is configured such that the circumstance of any switching threshold for the at least one sensor element output signal being exceeded and/or being fallen short of is provided with a hysteresis and/or in that computing of the relative velocity between the encoder and the sensor element in respect of the first and/or second limit velocity is provided with a hysteresis.

7. The sensor as claimed in claim 1, wherein the sensor is a wheel speed sensor.

\* \* \* \* \*